United States Patent Office 3,650,927
Patented Mar. 21, 1972

3,650,927
PHOTOPOLYMERIZATION UTILIZING DYE-SENSITIZED SULFONES
Steven Levinos, Chatham, N.J., assignor to Keuffel & Esser Company, Morristown, N.J.
No Drawing. Filed Dec. 2, 1969, Ser. No. 881,636
Int. Cl. C08d 1/00; C08f 1/16
U.S. Cl. 204—159.24
6 Claims

ABSTRACT OF THE DISCLOSURE

Rapid polymerization of vinyl monomers is accomplished by combining the monomer with a sulfone and a photoreducible dye and exposing the combination to light. The procedure is particularly useful in bulk polymerization where the monomer, sulfone, and dye are combined in a common solvent.

BACKGROUND OF THE INVENTION

Addition polymerization of various ethylenically unsaturated organic compounds such as vinyl compounds or vinyl monomers is well known. Generally, addition polymerization of monomeric vinyl compounds is brought about in the presence of a peroxide catalyst at elevated temperatures, the peroxide serving to supply a free radical for initiating the polymerization. Such a reaction can be carried out by employing a solution of the monomer, or it may be desirable to employ the monomer in the form of a dispersion. By using mixtures of various vinyl compounds it is possible to obtain a mixed polymer, or copolymer, having properties which differ from those of the homopolymer.

It is also known that many unsaturated monomers can be caused to polymerize by exposure to high intensity radiation, such as ultraviolet rays emanating from sunlight or a carbon arc. It is to be noted, however, that polymerization by the use of light alone proceeds at a much slower rate than polymerization brought about by the peroxide and heat. Moreover, the use of light unaided by other agents tends to result in lower molecular weight polymers.

The use of radiation alone to bring about polymerization of monomeric substances not only tends to produce low molecular weight products, but in addition dictates the use of high intensity radiation such as sunlight, flame carbon arc, mercury arc, and the like. It is, however, possible to amplify the efficiency of the exposing radiation by the use of certain catalytic materials generally referred to as photosensitizers or photoinitiators. Such activators, under the influence of the exposing radiation, give rise to an activated form, which actually brings about polymerization. The photoinitiators are activated upon exposure to light and these active structures trigger the polymerization reaction.

Photoinitiators useful for photopolymer systems may comprise a single component as described in U.S. 3,061,-431, British 866,631, and U.S. 3,065,160, or may be multicomponent photocatalyst systems as described in U.S. 3,101,270, U.S. 2,850,445, and U.S. 3,234,021.

A system of photocatalytic vinyl polymerization utilizing 2,7-dichloro diphenylene sulfone as the photoinitiator is described in U.S. 2,433,047. The system, however, is indicated to be useful in effecting polymerization under ultraviolet irradiation and at elevated temperature, and to require light exposures ranging in hours.

SUMMARY OF THE INVENTION

The present invention provides photopolymerization catalyst systems which comprise a combination of aliphatic or aromatic sulfones with photoreducible dyes. Vinyl monomers or combinations thereof are rapidly polymerized upon exposure to visible light in the presence of such catalyst systems. Rates of polymerization are further enhanced by the presence of metal salts, aliphatic or aromatic amines, and aldehyde/bisulfite complexes with synergistic rate improvement being achieved from combinations of these additives. Photocatalyst compositions of the invention are particularly useful in bulk polymerization procedures.

DESCRIPTION OF THE INVENTION

In accordance with the present invention, polymerization of vinyl monomers is accomplished by exposing a monomer or mixture of monomers to radiation in the presence of a photoinitiator comprising an aliphatic or aromatic sulfone and a photoreducible dye. For instance, acrylamide in an aqueous solution with a cross-linking agent is converted to a hard, polymeric mass in a matter of minutes by exposure to light in the presence of a sulfone and a photoreducible dye.

An intense source of light is not required to initiate the photopolymerization in systems herein described. For example, the photopolymerization of acrylamide may be carried out by exposing the monomers and photocatalyst mixture to an incandescent lamp of only 500 watts positioned at a distance of approximately 10 inches.

The dyes which may be used in accordance with this invention include any dyes which are capable of forming a stable system with a reducing agent in the absence of light and which will undergo reduction when irradiated with visible light in the presence of the reducing agent. Such photoreducible dyes include rose bengal, erythrosine, eosin, fluorescein, acriflavine, methylene blue, thionin, brilliant green, methylene green, riboflavin and methyl violet. The dyes may be used individually or in admixture to increase sensitivity over a wider range of the visible spectrum.

While the concentration of dye is not critical, the most efficient results are obtained when the concentration is adjusted so that at least 90 percent of the incident light is absorbed at the wave length corresponding to the absorption maximum of the particular dye employed.

The sulfones used as a component part of the photocatalyst system are very stable compounds and are insensitive to light in the visible region of the spectrum. Their ability to photoinitiate polymerization of vinyl monomers when used in admixture with photoreducible dyes is believed to involve a redox mechanism in which the photoexcited dye is capable of oxidizing the sulfone with the concomitant formation of a free radical. It is apparently this photogenerated free radical which initiates the polymerization process.

Aromatic and aliphatic sulfones suitable for the purposes of this invention include:
Methyl phenyl sulfone
Divinyl sulfone
3-aminophenyl sulfone
Butadiene sulfone
Tetramethylene sulfone
Phenyl sulfone
p-Aminophenyl sulfone
n-Propyl sulfone The quantity of sulfone employed may be varied over a wide range. The time required for initiation of the polymerization reaction will normally be decreased as the quantity of sulfone is increased.

Any normally liquid or solid photopolymerizable unsaturated organic compound is applicable in the practice of my invention. Preferably, such compounds should be ethylenically unsaturated, i.e. contain at least one non-aromatic double bond between adjacent carbon atoms. Compounds particularly advantageous include vinyl or vinylidene compounds containing a $CH_2\!\!=\!\!C\!\!<$ group activated by direct attachment to a negative group such as halogen, $>\!\!C\!\!=\!\!O$, $-C\!\equiv\!N$, $-C\!\equiv\!C\!-$, $-O\!-$, or aryl. Examples of photopolymerizable compounds include acrylamide, acrylonitrile, diacetone acrylamide, N-methylolacrylamide, N-isopropyl acrylamide, acrylic acid, methacrylic acid, methacrylamide, vinyl acetate, methyl methacrylate, methyl acrylate, ethyl acrylate, vinyl benzoate, vinyl pyrrolidone, barium acrylate, barium methacrylate, zinc acrylate, calcium acrylate, magnesium acrylate, itaconic acid, itaconic esters, mixtures of ethyl acrylate with vinyl acetate, acrylonitrile with styrene, butadiene with acrylonitrile.

The ethylenically unsaturated organic compounds, or monomers, may be used either alone or in admixture in order to vary the physical properties, such as molecular weight, hardness, solubility, of the final polymer. Thus, in order to produce a vinyl polymer of the desired physical properties, it is recognized practice to polymerize the vinyl monomer in the presence of a small amount of an unsaturated compound containing at least two terminal vinyl groups each linked to a carbon atom in a straight chain or in a ring. The function of such compounds is to cross-link the polyvinyl chains. Cross-linking agents which can be utilized for the purpose described herein include N,N-methylene-bisacrylamide, triallyl cyanurate, divinyl benzene, divinyl ketones and diglycol diacrylate. Difunctional monomers such as calcium acrylate, barium acrylate, zinc acrylate and the like may also be advantageously employed. Generally, increasing the quantity of cross-linking agent increases the hardness of the polymer obtained. The quantity of cross-linking agent may desirably range from about 2 to 10 parts for 100 parts of monomer.

The present invention is particularly useful for bulk polymerization of vinyl monomers or mixtures thereof. The polymerization is usually carried out in a water or organic solvent solution of the monomer depending upon its solubility characteristics. If an organic solvent system is employed, provisions should be made for the presence in the system of a small quantity of water, e.g. about 0.1 to 5% by weight. The water may be added as such or may be supplied by incorporating in the reaction mixture a humectant such as ethylene glycol, glycerin or the like.

With the exception of tetramethylene sulfone, the other sulfones referred to herein are insoluble or only slightly soluble in water, and it therefore becomes necessary to employ a suitable solvent. Preferably, the solvent should be one in which the monomer is soluble but in which the photoformed polymer is insoluble. Moreover, the solvent should preferably be miscible with water, since a water-based system offers the advantages of convenience, and of economy. Although the alcohols meet these requirements, their boiling points are too low for practical utilization. In addition, the presence of alcohols often results in lower molecular weight polymers since they are chain transfer agents.

When bulk polymerizing vinyl monomers, a particularly desirable solvent for the sulfones is methyl Cellosolve acetate. It has a boiling point of 140° C. and is therefore not lost by volatilization through heat that is generated in the polymerization reaction. It is also compatible with the other components of the system. In addition, it has been found that it accelerates the rate at which insoluble polymer is photoformed.

The quantity of sulfone employed may be varied over a wide range from a few milligrams to saturation in the selected solvent. Care must be exercised, however, in preparing the photopolymerizable mixture to avoid precipitating or otherwise throwing the sulfone out of solution. To this end, the quantity of sulfone selected must be such that a homogeneous mixture results. Table 1 lists the approximate saturation solubilities of various typical sulfones in 5 ml. of methyl Cellosolve acetate at 25° C.

TABLE 1

Phenyl sulfone—100 mg.
Methyl phenyl sulfone—80 mg.
Butadiene sulfone—4.63 g.
3-aminophenyl sulfone—264 mg.
p-Aminophenyl sulfone—1.46 g.
Divinyl sulfone—$\infty$
Tetramethylene sulfone—$\infty$ (and in $H_2O$)
n-Propyl sulfone—$\infty$ The rate at which insoluble polymer is photoformed may be accelerated by the inclusion of metal salts in the photopolymerizable composition. These include the chlorides of lithium, sodium, potassium, calcium, barium, strontium, magnesium, cadmium, mercury and zinc; the sulfates of lithium, sodium, potassium and beryllium; the acetates of lithium, sodium, potassium, calcium and zinc; lithium nitrate, sodium nitrate and potassium nitrate, among others.

Other additives by means of which the rate of forming insoluble polymer may be enhanced when the photopolymerizable composition is exposed to actinic radiation are the primary, secondary and tertiary aliphatic or aromatic amines and amine salts. Examples include monoethanolamine, diethanolamine, triethanolamine and their formic, boric, or hydrochloric acid salts, aniline salts such as the hydrochloride, oxalate, acetate, or hydrogen phthalate, diphenylamine hydrochloride, and the like. The choice of amine is dictated by considerations of the solvent employed and compatibility with the other components of the system.

Still other additives that enhance the rate at which insoluble polymer is photoformed are the aldehyde/sodium bisulfite addition products, such as formaldehyde/sodium bisulfite, acetaldehyde/sodium bisulfite and glutaraldehyde/sodium bisulfite.

Further enhancement of the rate at which insoluble polymer can be formed can be achieved by thermal means. For example, heating the photopolymerizable composition before, during or after a light exposure which is just sufficient to start the polymerization reaction results in a rapid completion of the polymerization process. Generally speaking, however, the molecular size of a polymer decreases as the polymerization temperature increases.

PREFERRED EMBODIMENTS

Example 1

A stock solution of the following composition was prepared:

N-methylol acrylamide (60% aq. sol.)—300 ml.
Calcium acrylate—24 g.
N,N'-methylenebisacrylamide—10 g.

To 20 ml. of this solution were added 5 ml. of methyl cellosolve acetate in which were dissolved 80 milligrams of methyl phenyl sulfone. To this mixture was also added 0.2 ml. of a 0.2 percent aqueous solution of rose bengal. A 10 ml. portion of this mixture was then exposed in a test tube to the light of a 500 watt photoflood lamp positioned at a distance of about 10 inches from the test sample. A white, opaque polymer started to form after an exposure of about 11 minutes. A sample of the same composition without rose bengal did not show any evidence of polymer formation after an exposure of 23 minutes.

Example 2

To a 10 ml. portion of the dye-sensitized composition of Example 1 was added enough acetaldehyde/sodium bisulfite to saturated the solution. When this mixture was exposed as in the preceding example, polymerization ensued in about 6 minutes. Similar results were obtained when employing formaldehyde/sodium bisulfite or glutaraldehyde/sodium bisulfite in lieu of acetaldehyde/sodium bisulfite.

Example 3

A 10 ml. portion of the composition of Example 1 comprised of monomers, methyl phenyl sulfone and rose bengal was saturated with aniline hydrochloride and then exposed to actinic radiation as previously described. White, opaque polymer began to form upon an exposure time of about 1.3 minutes.

Example 4

To 10 ml. of the dye-sensitized composition of Example 2, which was also saturated with acetaldehyde/sodium bisulfite, was added sufficient aniline hydrochloride to saturate the solution with respect to this component. This mixture was then exposed to light as in Example 1. White, opaque polymer started to form upon an exposure of about 30 seconds. Thus is demonstrated a synergistic polymerization accelerating effect obtained when employing an amine salt in admixture with an aldehyde/sodium bisulfite addition compound.

Example 5

Fifteen ml. of the monomer composition of Example 1 were mixed with 5 ml. of n-propyl sulfone and 5 ml. of methyl Cellosolve acetate. A 0.2% aqueous solution of rose bengal, 0.2 ml., was then added. About 5 ml. of this solution was retained as a control, and two additional 5 ml. portions were saturated, respectively, with acetaldehyde/sodium bisulfite, and both the bisulfite complex and aniline acetate. All samples were exposed to light as in Example 1. The control began to polymerize in about 12 minutes; the sample with the complex alone, in about 6.3 minutes; and the sample with the combination of accelerators, in about 2.3 minutes.

Example 6

Example 5 was repeated in every detail except that 5 ml. of tetramethylene sulfone was used in lieu of the n-propyl sulfone. Results were as follows:
The control started to polymerize in about 8.3 minutes; the sample with complex alone started to polymerize in about 4.7 minutes; and the sample with mixed accelerators started to polymerize in about 45 seconds.

Example 7

A monomer solution of the following composition was prepared:

Acrylamide—90 g.
N,N'-methylenebisacrylamide—5 g.
Water—60 ml.

To 20 ml. of this solution were added 5 ml. of methyl Cellosolve acetate in which were dissolved 250 milligrams of 3-aminophenyl sulfone. Two-tenths (0.2) of a milliliter of a 0.2 percent aqueous solution of rose bengal were then added. The mixture was divided into two equal parts in test tubes and exposed to light as in Example 1. The exposure was continued until polymer began to appear. One test tube was then placed in water which had been pre-heated to a temperature of 50° C. Polymerization was completed within a matter of minutes whereas the unheated portion remained fluid save for the small amount of polymer that had been initially photoformed.

Example 8

To 20 ml. of the monomer solution of Example 7 were added 5 ml. of methyl Cellosolve acetate in which were dissolved 250 mg. of p-aminophenyl sulfone. This was followed by the addition of 0.2 ml. of a 0.2 percent aqueous solution of rose bengal. Polymer started to form in about 2.5 minutes when the mixture was irradiated as in the previous examples. There was no evidence of polymer formation after irradiation for 15 minutes without the dye addition.

Example 9

One gram of butadiene sulfone was dissolved in 5 ml. of methyl Cellosolve acetate. Fifteen ml. of a 20 percent solution of calcium acrylate were then added. The mixture was dye-sensitized by the addition of 0.2 ml. of a 0.2 percent aqueous solution of thionin. When exposed to light under the conditions of Example 1, polymer began to slowly form after a period of about 5.5 minutes. It is very likely in this case that a butadiene:calcium acrylate copolymer was formed.

Example 10

Example 9 was repeated except that the thionin dye was replaced by an equal volume of a 0.2 percent aqueous solution of rose bengal. Polymer began to form after irradiating for 7 minutes. As in the preceding example, a butadiene:calcium acrylate copolymer was very likely formed.

Example 11

To 17.5 ml. of the monomer composition of Example 7 were added 7.5 ml. of methyl Cellosolve acetate in which were dissolved 150 milligrams of phenyl sulfone. Then 0.2 ml. of a 0.2 percent aqueous solution of rose bengal was added, and the mixture was irradiated as in Example 1. Polymer started to form after the mixture had been exposed for a 10 minutes period, and continued to form as the light exposure was continued. A semisolid, white polymeric mass was formed in approximately 20 minutes.

Example 12

Three ml. of divinyl sulfone were added to 5 ml. of methyl Cellosolve acetate, followed by 12 ml. of the monomer composition of Example 1. Twenty-five (25) milligrams of acetaldehyde sodium bisulfite were then dissolved in this mixture which was then also dye-sensitized with 0.2 ml. of a 0.2 percent aqueous solution of thionin. Polymer started to form after 11 minutes when irradiated as in Example 1. At the end of 18 minutes a solid, polymeric mass had formed.

The above examples have been presented for the purpose of illustration and should not be taken to limit the scope of the present invention. It will be apparent that the described examples are capable of many variations and modifications which are likewise to be included within the scope of the present invention as set forth in the appended claims.

What is claimed is:
1. A method of polymerizing an ethylenically unsaturated polymerizable compound comprising:
   (a) combining said polymerizable compound with an aliphatic or aromatic sulfone and a photoreducible dye; and
   (b) exposing the resulting combination to light.
2. The method according to claim 1 which further comprises adding to said combination an accelerator compound selected from the class consisting of amines, amine salts, metal salts, and aldehyde/bisulfite complexes.
3. The method according to claim 1 which further comprises adding to said combination at least one aldehyde/bisulfite complex accelerator and at least one additional accelerator compound selected from the group consisting of amines and amine salts.
4. The method according to claim 1 wherein said polymerizable compound, said sulfone, and said photoreducible dye are combined in a solution in a common solvent.
5. The method according to claim 4 wherein said solvent is methyl Cellosolve acetate.
6. The method according to claim 1 wherein said sul- fone is selected from the group consisting of phenyl-, methyl phenyl-, butadiene-, 3-aminophenyl-, p-aminophenyl-, divinyl-, tetramethylene-, and n-propyl-sulfones.

References Cited
UNITED STATES PATENTS

| | | | |
|---|---|---|---|
| 2,433,047 | 12/1947 | Hayes | 204—159.24 |
| 3,097,096 | 7/1963 | Oster | 204—159.23 |

SAMUEL H. BLECH, Primary Examiner
R. B. TURNER, Assistant Examiner

U.S. Cl. X.R.
96—115 P; 204—159.23